March 6, 1928.

D. C. PRINCE

ELECTRICAL SYSTEM

Filed May 18, 1925

1,661,850

Inventor:
David C. Prince,
by *Alexander S. Lent*
His Attorney.

Patented Mar. 6, 1928.

1,661,850

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

ELECTRICAL SYSTEM.

Application filed May 18, 1925. Serial No. 30,938.

My invention relates to electrical systems, and has for its principal object the provision of an improved arrangement comprising an electron discharge device for interchanging power between direct and alternating current systems in a simple and reliable manner.

Various arrangements comprising an electron discharge device have been proposed in the past for controlling the power interchanged between different electrical systems. Many of these arrangements have involved the cooperation of a very considerable number of parts which are likely not to be altogether dependable in their operation. In accordance with my invention this difficulty is largely avoided through the use of a vapor electric device arranged to interconnect the systems between which power is interchanged and provided with grid or control circuits connected to one of the systems in a manner to ensure that the proper relation is maintained between the grid and system voltages under different conditions of operation.

My invention will be better understood from the following description when considered in connection with the accompanying drawings, and its scope will be pointed out in the appended claims.

Figure 1:
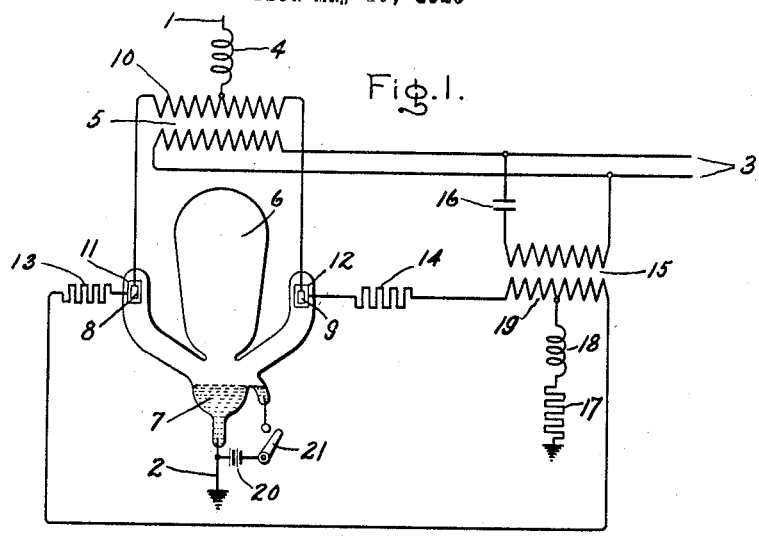
Figure 2:
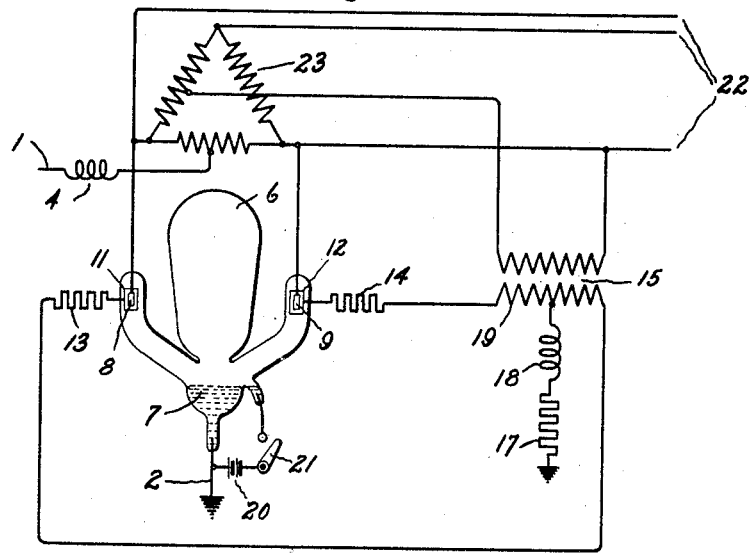

Referring to the drawings, Fig. 1 shows an arrangement for interchanging power between a direct current system and a single phase alternating current system; and Fig. 2 shows an arrangement for interchanging power between a direct current system and a polyphase alternating current system, the drawing being simplified by showing only the control equipment associated with one phase of the polyphase system.

In Fig. 1 a direct current system is indicated by conductors 1 and 2, which are connected to an alternating current system 3 through a reactor 4, a transformer 5 and an electron discharge device shown as a mercury rectifier 6. The device 6 is provided with a cathode 7 connected to the grounded conductor 2 of the direct current system, with anodes 8 and 9 connected to the opposite terminals of the primary circuit 10 of main transformer 5, and with grids 11 and 12 connected to the alternating current system 3 through current limiting resistors 13 and 14, transformer 15 and a condenser 16, the cathode 7 being connected through resistor 17 and reactor 18 to the secondary circuit 19 of the transformer 15 at a point intermediate its ends. The condenser 16 is thus connected in series relation with the grids 11 and 12. A battery 20 and switch 21 are provided for initiating operation of the device 6 in a well known manner.

With these connections, the reactor 4 smooths out fluctuations in the electrical conditions of the direct current circuit, the resistors 13, 14 and 17 limit the current transmitted through the grid or control circuits of device 6, the condenser 16 causes the voltage impressed on the grids 11 and 12 to lead that applied to the working anodes 8 and 9, and the reactor 18 modifies the wave form of the grid potential in a manner to ensure satisfactory operation of the device 6.

Assuming operation of the device 6 to have been initiated and the alternating current line 3 to be operating at its normal frequency and voltage, current will be transmitted between the direct current conductors 1 and 2 through the reactor 4, the left-hand portion of primary winding 10, anode 8 and cathode 7 when the left-hand terminal of the transformer 5 is charged to a negative potential with respect to its mid-point, and through reactor 4, the right-hand portion of primary winding 10, anode 9, and cathode 7 when the right-hand terminal of transformer 5 is charged to a negative potential with respect to the mid-point potential. The frequency with which the polarity of transformer 5 is reversed is determined by the frequency of the alternating current line 3, which thus serves to reverse the direction of current transmission through the primary circuit 10 and to cause current to be supplied from the direct current conductors 1 and 2 to the alternating current system 3.

In a system of the type described, it is essential for efficient and satisfactory operation that the transmission of current through one arm of the device should be initiated before its transmission through the other arm is terminated. This result is produced by the condenser 16 which causes the grids 11 and 12 to be charged to a positive potential slightly in advance of the working anodes 8 and 9. This feature is disclosed and claimed in a copending application of Ernst F. W. Alexanderson, Serial No. 651,409, filed July 13, 1923.

Fig. 2 shows an arrangement which differs from that previously described in that the device 6 is interconnected with one phase of a polyphase system 22 instead of a single phase system and in that the lead in the grid potentials of device 6 is produced by connecting the primary circuit of the transformer 15 from one terminal of a polyphase transformer 23 to a point intermediate the terminals of a phase which is not connected between the anodes of device 6. The operation of this arrangement will be readily understood in view of what has been said with respect to Fig. 1. It will be apparent that the interchange of current between the direct current system and all phases of the polyphase system may be effected by the use of three devices similar to the device 6.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States is:—

1. The combination of a polyphase transformer, a vapor electric device provided with anodes connected to the terminals of one phase of said transformer and with a cathode and grids arranged to cooperate with said anodes, a direct current circuit connected to said cathode and to said phase at a point intermediate its terminals, and means connected between one of said terminals and a point intermediate the ends of another phase of said transformer for causing the voltage applied to said grids to differ in phase from the voltage applied to said anodes.

2. The combination of a polyphase transformer, a vapor electric device provided with anodes connected to the terminals of one phase of said transformer and with a cathode and grids arranged to cooperate with said anodes, a direct current circuit connected to said cathode and to said phase at a point intermediate its terminals, and a potential transformer connected between one of said terminals and a point intermediate the terminals of another phase of said polyphase transformer for applying to said grids a voltage which leads the voltage applied to said anodes.

3. The combination of a transformer comprising a plurality of phases, a vapor electric device provided with a cathode and anode and with a grid arranged to control the current transmitted between said cathode and anode, a direct current circuit connected to one phase of said transformer through said cathode and anode, means connected between one terminal of said phase and a point intermediate the terminals of another of said phases for controlling the phase relation between the voltages of said grid and anode, and a reactor and resistor connected in circuit with said grid.

In witness whereof, I have hereunto set my hand this 16th day of May, 1925.

DAVID C. PRINCE.